9 Sheets—Sheet 1.

L. CHAPMAN.
MACHINE FOR MAKING SLEDGES.

No. 172,248.   Patented Jan. 18, 1876.

WITNESSES
John Pollitt
Edward S. Bill

INVENTOR
Luke Chapman
By W. E. Simonds
Atty.

9 Sheets—Sheet 2.
L. CHAPMAN.
MACHINE FOR MAKING SLEDGES.
No. 172,248. Patented Jan. 18, 1876.
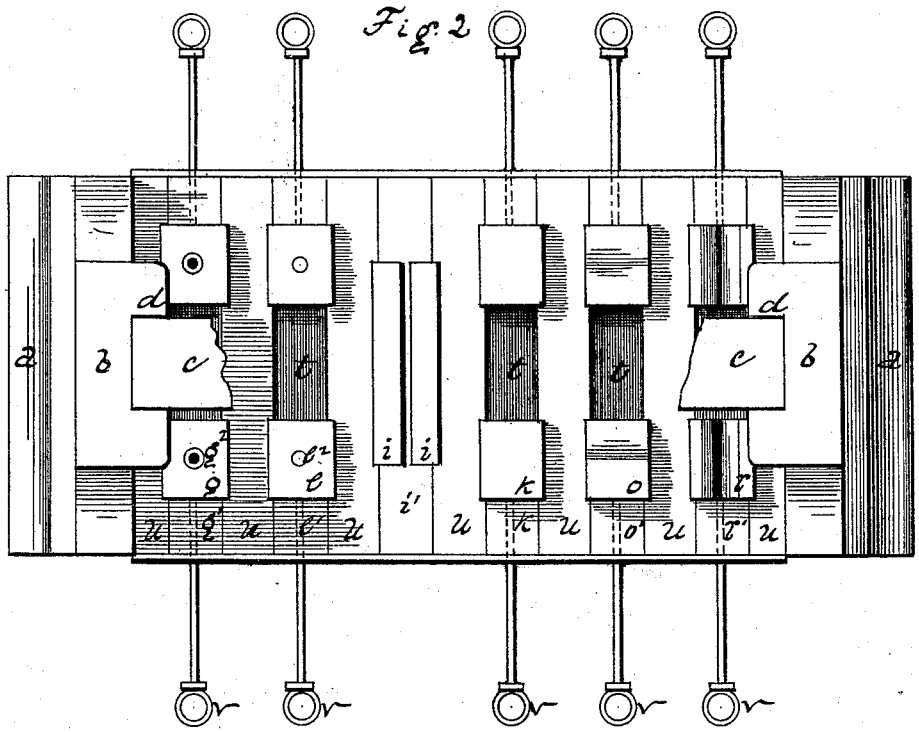
WITNESSES
John Pollitt
Edward S. Bill
INVENTOR
Luke Chapman
By W. E. Simonds
Atty.

9 Sheets—Sheet 3.

L. CHAPMAN.
MACHINE FOR MAKING SLEDGES.

No. 172,248. Patented Jan. 18, 1876.

WITNESSES
John Pollitt
Edward S. Bill

INVENTOR
Luke Chapman
By W. E. Simonds
Atty.

N. PETERS, PHOTO-LITHOGRAPHER, WASHINGTON, D. C.

9 Sheets—Sheet 4.

L. CHAPMAN.
MACHINE FOR MAKING SLEDGES.

No. 172,248. Patented Jan. 18, 1876.

Witnesses,
John Pollitt
Edward S. Bill

Inventor
Luke Chapman
By W. E. Simonds
Atty.

N. PETERS, PHOTO-LITHOGRAPHER, WASHINGTON, D. C.

9 Sheets—Sheet 5.

L. CHAPMAN.
MACHINE FOR MAKING SLEDGES.

No. 172,248. Patented Jan. 18, 1876.

WITNESSES
John Pollitt
Edward S. Bill

INVENTOR
Luke Chapman
By W. E. Simonds
Atty.

9 Sheets—Sheet 6.

L. CHAPMAN.
MACHINE FOR MAKING SLEDGES.

No. 172,248.             Patented Jan. 18, 1876.

WITNESSES
John Pollitt
Edward S. Bill

INVENTOR
Luke Chapman
By W. E. Simonds
Atty.

9 Sheets—Sheet 7.

L. CHAPMAN.
MACHINE FOR MAKING SLEDGES.

No. 172,248. Patented Jan. 18, 1876.

WITNESSES
John Pollitt
Edward S. Bill

INVENTOR
Luke Chapman
By W. E. Simmons
Atty.

9 Sheets—Sheet 8.

L. CHAPMAN.
MACHINE FOR MAKING SLEDGES.

No. 172,248. Patented Jan. 18, 1876.

WITNESSES.
John Pollitt
Edward S. Bill.

INVENTOR
Luke Chapman
By W. E. Simonds
Atty.

9 Sheets—Sheet 9.

L. CHAPMAN.
MACHINE FOR MAKING SLEDGES.

No. 172,248. Patented Jan. 18, 1876.

WITNESSES
John Pollitt
Edward S. Bill.

INVENTOR
Luke Chapman
By W. E. Simonds
Atty.

UNITED STATES PATENT OFFICE.

LUKE CHAPMAN, OF COLLINSVILLE, CONNECTICUT, ASSIGNOR TO THE COLLINS COMPANY, OF SAME PLACE.

IMPROVEMENT IN MACHINES FOR MAKING SLEDGES.

Specification forming part of Letters Patent No. 172,248, dated January 18, 1876; application filed November 8, 1875.

*To all whom it may concern:*

Be it known that I, LUKE CHAPMAN, of Collinsville, in the county of Hartford and State of Connecticut, have invented certain new and useful Improvements pertaining to Machinery for Producing Sledges and similar implements, of which the following is a specification, reference being had to the accompanying drawings, where—

Figure 1:
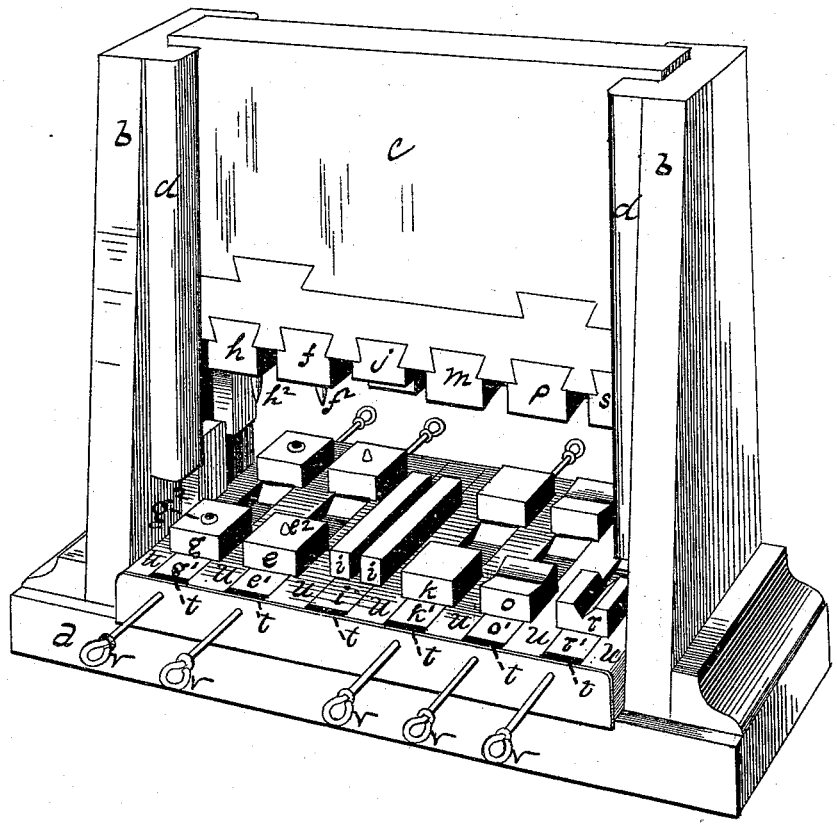
Figure 4:
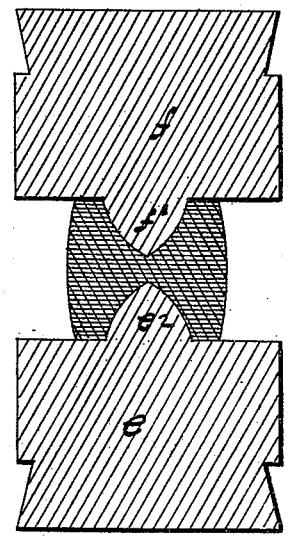
Figure 5:
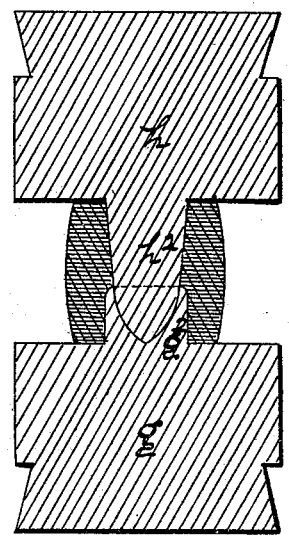
Figure 6:
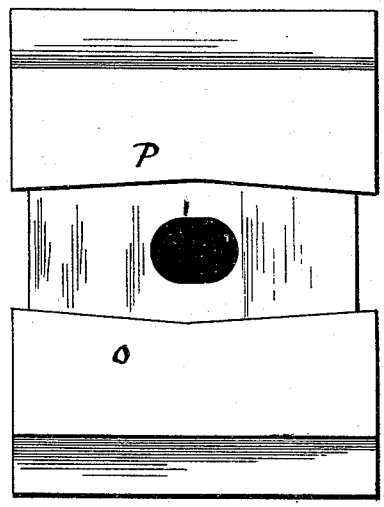
Figure 7:
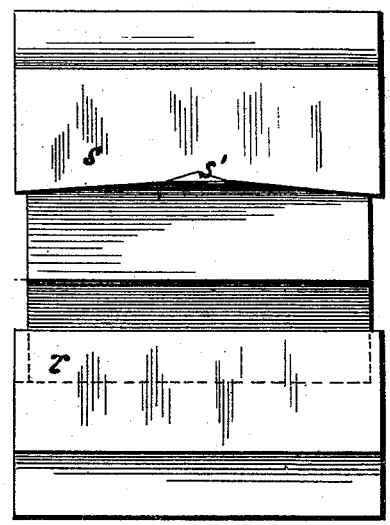
Figure 8:
Figure 9:
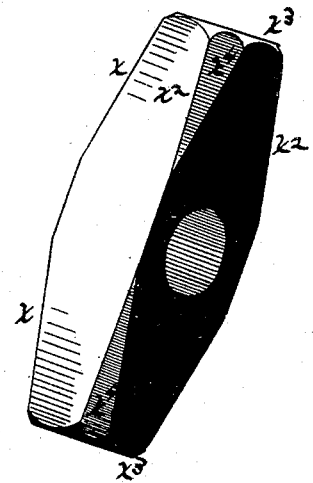
Figure 10:
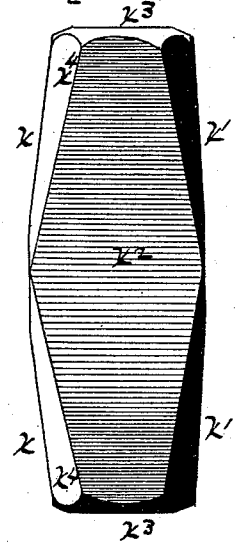
Figure 11:
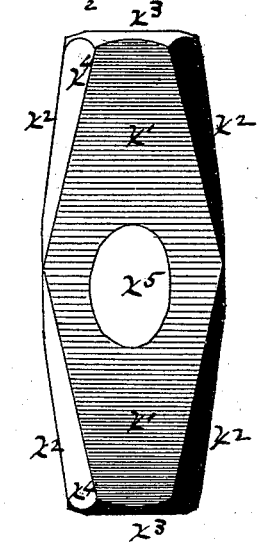

Figure 1 is a perspective view of the machine made use of for operating the dies. Fig. 2 is a view looking down upon the bed of dies which is at the base of the machine, the body of the follower broken away. Fig. 3 is a view of the face of the dies which are upon the lower side or face of the reciprocating follower. Fig. 4 is a view in central vertical cross-section of the partial punch-dies. Fig. 5 is a view in central vertical cross-section of the complete punch-dies. Fig. 6 is a side view of the side-forming dies. Fig. 7 is a side view of the chamfering-dies. Fig. 8 is a view of a punch made use of. Fig. 9 is a view of a completed sledge, in the manufacture of which the dies hereinbefore referred to are used. Fig. 10 is a side view of the sledge shown in Fig. 9. Fig. 11 is a bottom view of the sledge shown in Fig. 9.

The letter $a$ denotes the base, and $b\,b$ standards, of the machine for operating the dies. The letter $c$ denotes a follower, having by any proper means—and the exact means are not essential—reciprocating motion in the ways $d\,d$, which are on the standard. I prefer that the follower have a continuous reciprocating motion, in distinction from single reciprocations. For the operations it performs require the putting forth of great force, and clutch-motions are difficult to use satisfactorily in such connection; and in order that this follower may have continuous reciprocation, I have made the under dies so that they can be withdrawn at pleasure, as will be hereinafter explained.

The first step is to take a bar of wrought-iron or steel, square or rectangular in cross-section, and cut it into lengths each containing stock sufficient for the desired sledge. It is then deeply prick-punched on one side at the place where will afterward be the eye of the sledge. The stock-piece thus prepared is properly heated, preferably to a cherry-red, and submitted to the action of the partial punch-dies $e\,f$, one of which is in the lower set of dies, and the other is borne on the under side of the follower. These dies have, respectively, the teat-punch $e^2\,f^2$. The prick-punch in the stock-piece is set upon the lower teat-punch, and the follower coming down, the upper teat-punch enters, as shown in Fig. 4. The lower dies $e\,g\,i\,k\,o\,r$ are set, respectively, upon the die-blocks $e^1\,g^1\,i'\,k'\,o'\,r'$, which are set in the dovetail grooves or ways $t$ in the bed $u$, and by means of the handles $v$ they can be shoved under the follower for operation, or withdrawn therefrom, the latter being the position shown in Fig. 1. When the stock-piece is to be operated on by any of these sets of dies it is placed upon the lower die, which is then out from under the follower, and the die is moved under the follower, so that the corresponding upper die can come down upon it. The bed $u$ is furnished with two complete sets of the dies $e\,g\,i\,k\,o\,r$, one set upon each side of the machine, so that separate sets of workmen can work upon the two sides of the machine. Of course both workmen, or both sets of workmen, cannot use the same dies at the same time. After the stock-piece has been submitted to the action of the partial punch-dies $e\,f$, it is then submitted to the action of the complete punch-dies $g\,h$, the latter of which has the recessed punch $h^2$, and the former the recessed punch $g^2$. Fig. 5 shows the operation of this set of dies. The stock-piece is now submitted to the action of the chamfering-dies $r\,s$, the former of which has an angular channel running from end to end, (see Fig. 1,) and the latter is beveled from center to ends, with a central recess, $s'$, which prevents the upper die (which does the chamfering) from chamfering the stock-piece at the center, (see Fig. 7,) and the bevels from center to ends cause the chamfers to be broadest at the ends of the stock-piece. The stock-piece is laid into the lower die diamondwise or cornerwise, so that when the upper die comes down it strikes on the corner of the stock-piece, and makes the chamfer. Four strokes are taken, so as to chamfer all the corners. The stock-piece is now reheated, the punch $w$ inserted in the eye, and driven through the stock by the die $j$, the stock resting meanwhile on the die $i$, the eye being over the groove therein, and the punch running down into the groove. The stock-piece, with the punch $w$ in its eye, is now pressed sidewise between the side-forming dies $o$ $p$, which are beveled from center to ends, and are corresponding duplicates. (See Fig. 6.) The stock-piece is now laid on die $i$, with the point of punch $w$ pointing upward, and die $j$ descends and drives the punch out of the stock-piece. The stock-piece is now laid bottom down on the die $k$, which is flat-faced, or but slightly beveled from center to ends, and the die $m$, beveled from center to ends, comes down and forms the top of the sledge; and the operations with this machine and these dies are finished. The shapes of the faces of dies $k$ and $m$ correspond to the shapes of the bottom and top of the sledge, as shown in Fig. 10.

In order to explain what I mean by the top, bottom, and sides of the sledge I refer to Figs. 9, 10, and 11. The letter $x$ denotes the top; $x^1$, the bottom; $x^2$ $x^2$, the sides; $x^3$ $x^3$, the ends; $x^4$, the chamfers, and $x^5$ the eye. After the operation hereinbefore described it only remains, so far as forging is concerned, to work the ends by common methods into the shape shown in Figs. 9, 10, and 11.

This same machine, with proper changes in dies, is applicable to the manufacture of sledges and hammers of somewhat differing shapes, as to some of which I will explain.

Figure 22:
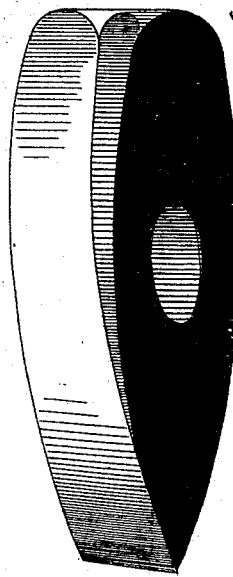
Figure 23:
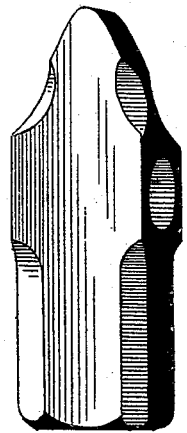
Figure 24:
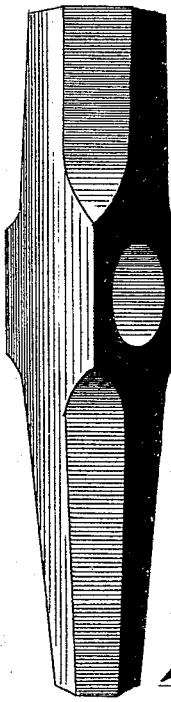
Figure 13:
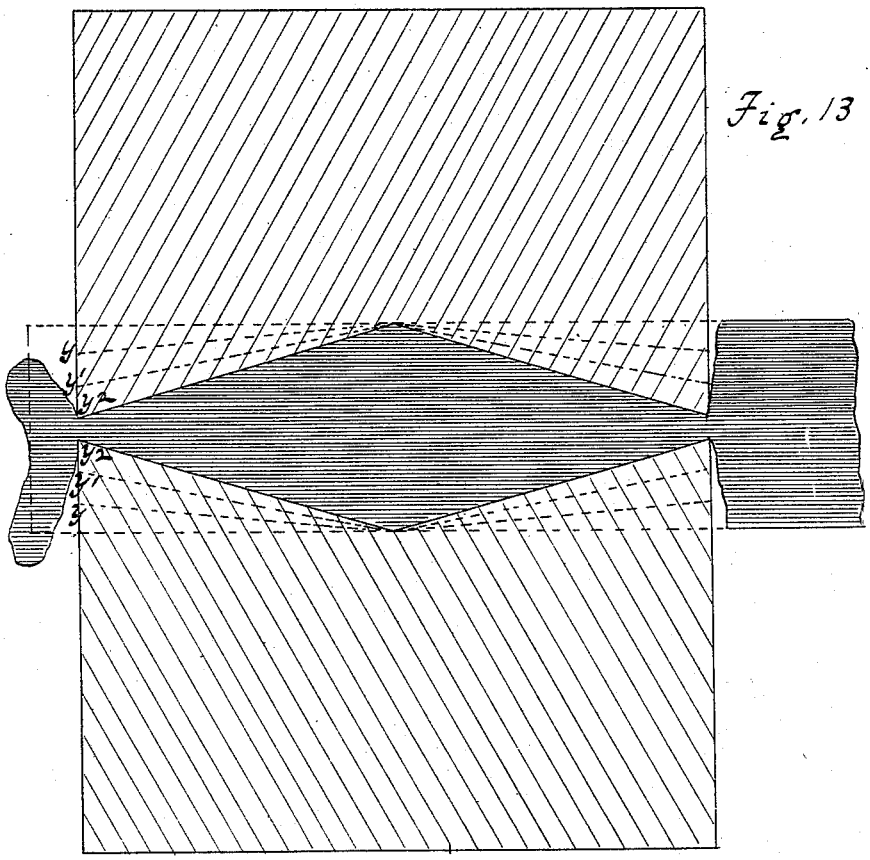
Figure 12:
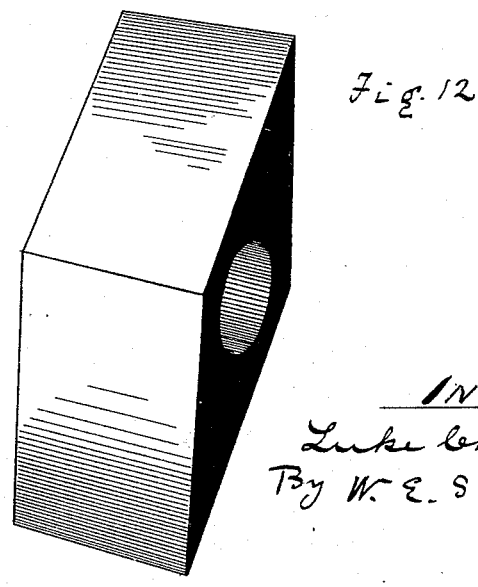
Figure 15:
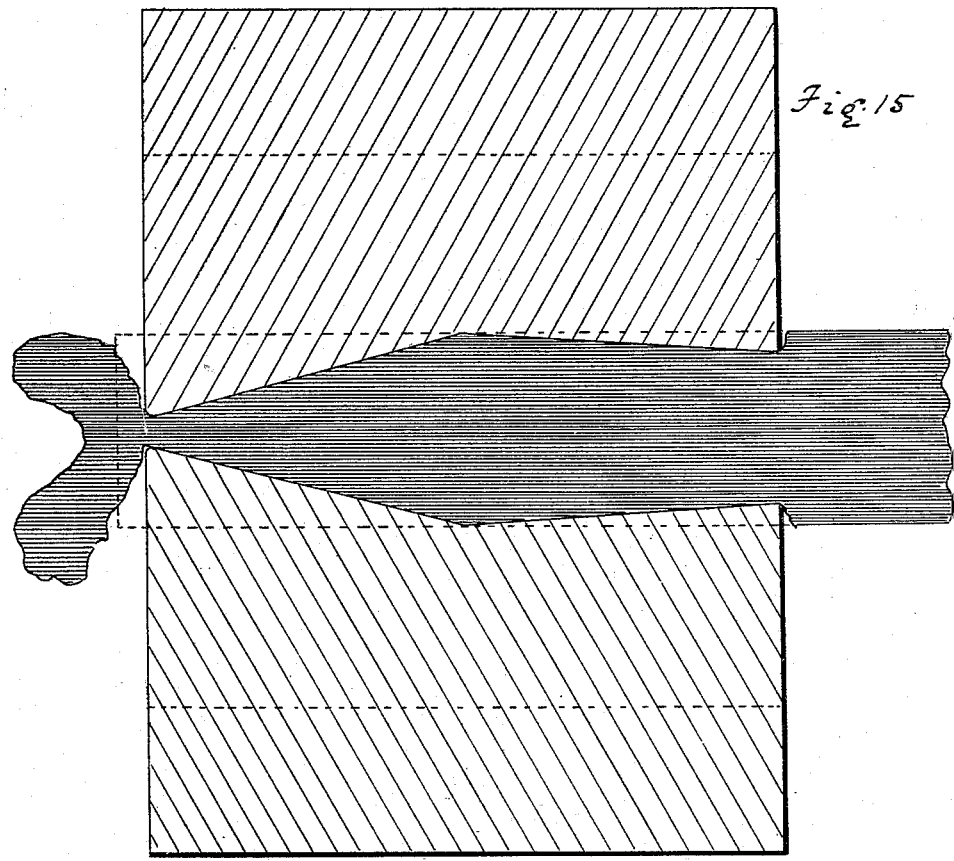
Figure 14:
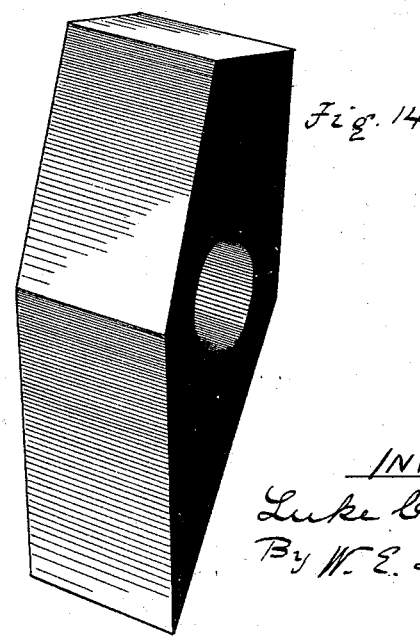
Figure 17:
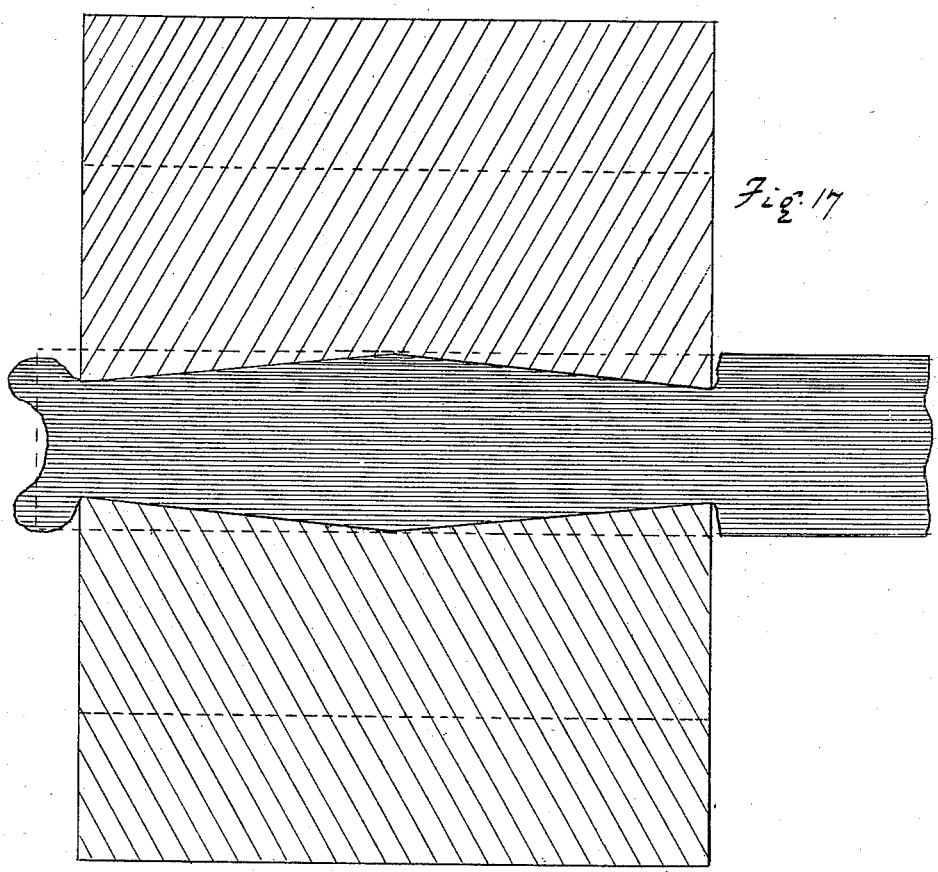
Figure 16:
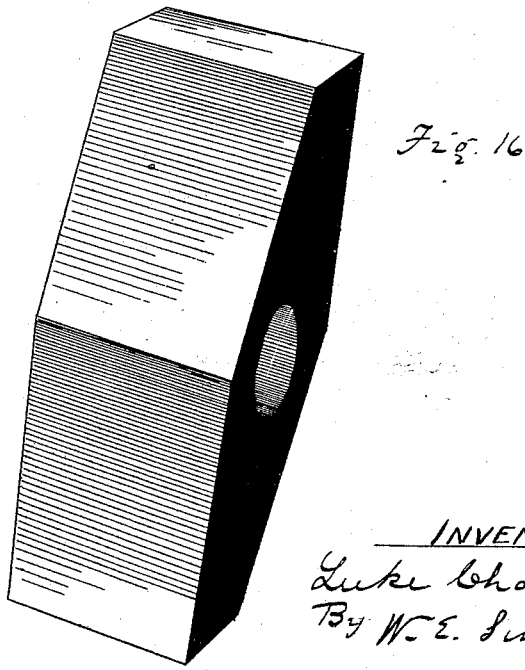
Figure 19:
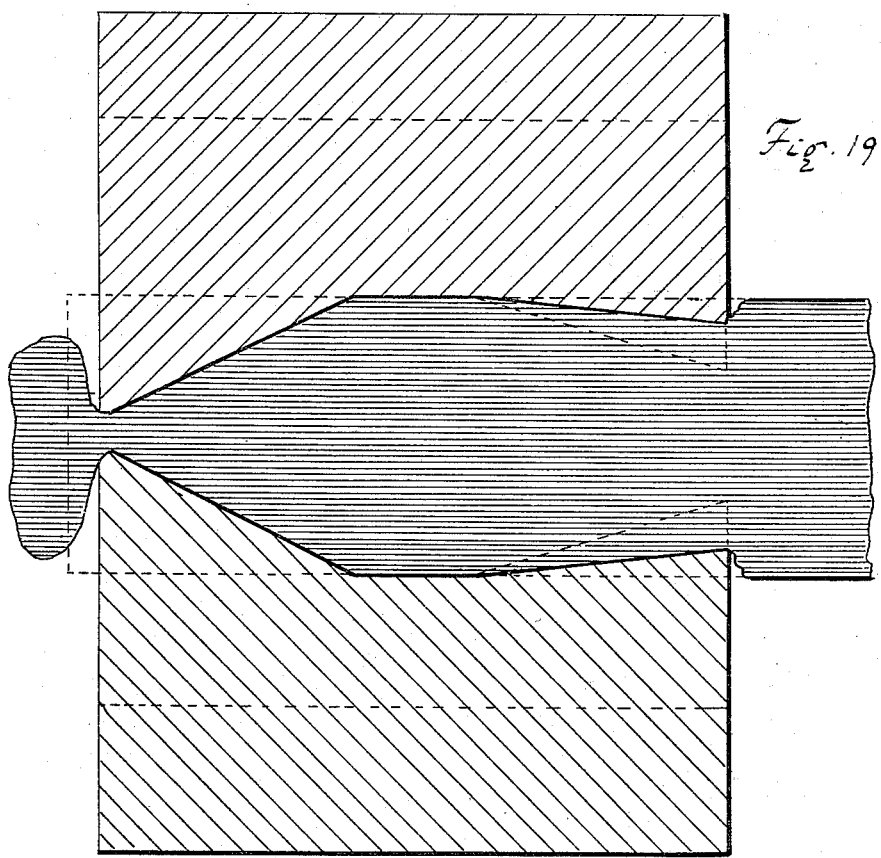
Figure 18:
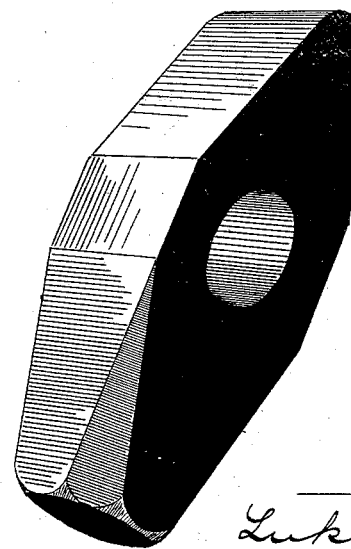
Figure 21:
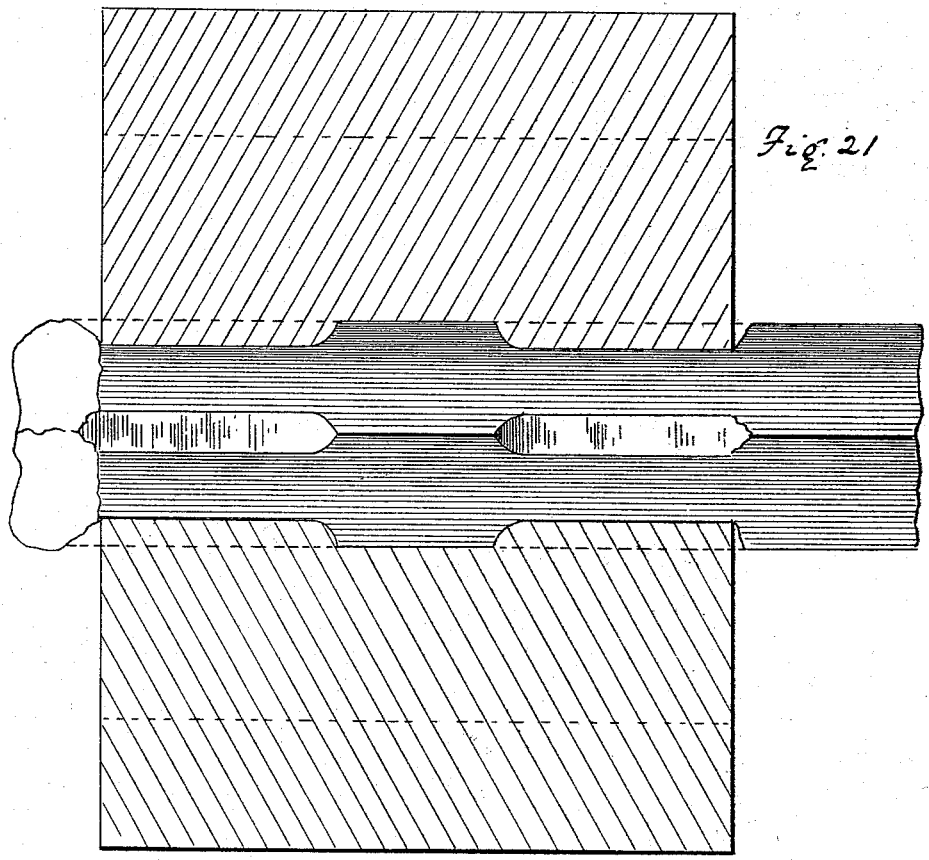
Figure 20:
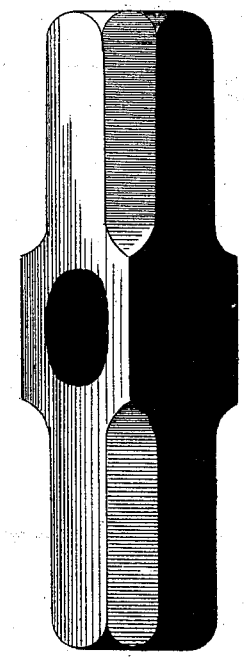

Fig. 12 shows a double-edged mason's sledge. The eye is formed in the same manner and by the same dies hereinbefore described, the top and bottom by the flat-faced dies; but the two sides are formed by a series of dies beveled from center to ends, the outlines of the faces of which are, respectively, denoted by the dotted lines $y$ $y^1$ and solid lines $y^2$. (See Fig. 13.) Fig. 14 shows a single-edged mason's sledge. The eye and top and bottom of this are formed by the same dies as first hereinbefore described; but the two sides are formed in dies beveled from center to ends, with bevels conforming to the shape of the sides. (See Fig. 15.) Fig. 16 shows a double-faced mason's sledge. The eye and top and bottom are formed by dies, as first hereinbefore described; but the two sides are formed by dies having beveled faces conforming to the shape of the sides. (See Fig. 17.) Fig. 18 shows a single pean-sledge. The eye and top and bottom are formed by dies, as first hereinbefore described, but the two sides by dies having faces beveled to correspond to the shape of the sides. (See Fig. 19.) Fig. 20 shows a large machinist's hammer. Its eye, all its sides and bevels can be formed by dies much the same as some of those hereinbefore described, with the additional dies shown in Fig. 21; and the same is true, with obvious modifications, as to the hammers shown in Figs. 22, 23, and 24.

The operations for all these hammers and sledges are much the same. All are made in the same machine, the sole changes being obvious ones in the shape of some of the dies.

The upper dies $f$ $h$ $j$ $m$ $p$ $s$ slide into the bottom of the follower in dovetail die-seats.

I claim as my invention—

1. In combination, the frame of the machine, the reciprocating die-bearing follower $c$, and die-blocks $e^1$, &c., in double sets, having reciprocations permissible in bed $u$, substantially as and for the purpose set forth.

2. In combination, dies $h$ $g$, $e$ $f$, $m$ $k$, $o$ $p$, and $r$ $s$, when all are constructed, shaped, and designed for use substantially as described.

LUKE CHAPMAN.

Witnesses:
OLIVER F. PERRY,
ALBERT L. THAYER.